United States Patent [19]

Huskins

[11] 4,097,662
[45] * Jun. 27, 1978

[54] CO-POLYMERS OF BUTADIENE AND CARBORANYL METHACRYLATE

[75] Inventor: Chester W. Huskins, Huntsville, Ala.

[73] Assignee: The United States of America as represented by the Secretary of the Army, Washington, D.C.

[ * ] Notice: The portion of the term of this patent subsequent to Oct. 21, 1992, has been disclaimed.

[21] Appl. No.: 736,806

[22] Filed: Oct. 29, 1976

[51] Int. Cl.$^2$ .......................... C08F 2/24; C08F 4/04; C08F 30/06; C08F 230/06
[52] U.S. Cl. .................................. 526/217; 526/218; 526/224; 526/239; 260/462 C
[58] Field of Search ...................... 526/239, 218, 217; 260/462 C

[56] References Cited

U.S. PATENT DOCUMENTS

| | | | |
|---|---|---|---|
| 3,183,216 | 5/1965 | Cohen et al. | 526/239 |
| 3,232,876 | 2/1966 | Abend | 526/239 |
| 3,553,170 | 1/1971 | Woods et al. | 526/239 |
| 3,699,024 | 10/1972 | Klingen et al. | 526/239 |
| 3,914,206 | 10/1975 | Huskins | 526/239 |

*Primary Examiner*—Herbert J. Lilling
*Attorney, Agent, or Firm*—Nathan Edelberg; Robert P. Gibson; Hugh P. Nicholson

[57] ABSTRACT

A co-polymer comprised of butadiene and carboranyl methacrylate is disclosed along with a method for preparation. The co-polymer is used as a combination plasticizer and catalyst for solid propellants. It is prepared by an emulsion polymerization process.

3 Claims, No Drawings

CO-POLYMERS OF BUTADIENE AND CARBORANYL METHACRYLATE

DEDICATORY CLAUSE

The invention described herein may be manufactured, used, and licensed by or for the Government for governmental purposes without the payment to me of any royalties thereon.

BACKGROUND OF THE INVENTION

Carborane (boron) compounds such as carboranyl methacrylate, N-hexylcarborane, and carboronyl methyl propionate, are used in composite and double base solid propellants. The main purpose of these compounds is to increase the propellant burning rate; their secondary purpose is to serve as a plasticizer. These organic-metallic compounds are liquids with relatively high vapor pressures. The high vapor pressures can lead to propellant composition instability problems when the rocket motors containing the propellants are stored in or subjected to elevated temperatures, which may be 60° C or higher. At such temperatures the liquid carborane compounds can evaporate from the propellant if the motor is not properly sealed. Such evaporation can alter the ballistic and mechanical properties of the propellant. This can make the reliability of the motor fall below that required in present day missiles and weaponry.

The reliability of propellants containing liquid plasticizer such as the carboranes can also be degraded because of migration of the plasticizers through the propellant. Many rocket motors have an inert rubbery liner which has bonded interfaces between the propellant and the motor metal wall. The liquid plasticizers tend to migrate from the propellant adjacent to the liner into the liner. This can cause the propellant ballistic properties to change and can cause the propellant to debond from the liner. The debonded propellant may have an exposed surface which will burn prematurely during motor operation. This will result in the motor pressure being greater than that intended, and may cause the missile to blow up or fail because of changed ballistics.

Experimentation has shown that the burning rate increase for propellants containing the carborane compounds is primarily a function of the amount of carboranyl boron in the propellant rather than a function of the molecular structure of the compound containing the boron. Therefore, the same desirable ballistic characteristics can be substantially obtained in propellants by including the carborane compounds as co-polymers of polymeric materials such as butadiene rather than as free molecules. This phenomenon proves to be very useful in overcoming the undesirable characteristics that exist when the carborane compounds are included in propellant as free molecules. The co-polymers can be prepared to have molecular weights that are many times that of the free carborane compounds. Thus prepared, they have vapor pressures that are near zero at high storage temperatures for missiles, and will not evaporate even though a rocket motor containing the co-polymer propellant is not sealed. Also, the co-polymers do not tend to migrate through the propellant mass. Therefore, there is a significant advantage in using the co-polymers in propellant formulations rather than the uncombined carborane compounds.

This invention relates to co-polymerizing carboranyl methacrylate with butadiene in order to achieve the above advantages in propellant formulations.

SUMMARY OF THE INVENTION

This invention relates generally to the creation of a co-polymer and more specifically to the creation of a co-polymer of butadiene and carboranyl methacrylate.

The co-polymer of butadiene and carboranyl methacrylate is prepared in an aqueous mixture by an emulsion polymerization process employing a quaternary ammonium chloride compound such as benzylcetyldimethylammonium chloride as an emulsifier, azo-bis-isobutyronitrile as the free radical type initiator, and dodecylmercaptan as the chain terminating agent.

The temperature range of the emulsified mixture in which the polymerization takes place may vary according to the proportions of each of the ingredients in the mixture. However, a temperature of about 50° C allows the polymerization to proceed smoothly and at a suitable rate for an average batch process. Yield after 16 hours of polymerization approaches 100%.

The co-polymer produced by the process is primarily intended for use as an ingredient in solid propellant compositions.

DESCRIPTION OF THE PREFERRED EMBODIMENTS

The ingredients given below are combined in a polymerization container which is equipped with means for agitating the mixture and with means for measuring and controlling the temperature.

| Ingredients | Weight |
|---|---|
| Butadiene | 26.0 gms |
| Carboranyl Methacrylate (CMA) | 6.0 gms |
| Dodecylmercaptan | 4.0 gms |
| Azo-bis-isobutyronitrile | 0.6 gms |
| Benzylcetyldimethylammonium Chloride | 2.0 gms |
| Water | 60 ml |

The polymerization mixture of the above ingredients is placed in a water bath at 50° C. A shaking or agitating action causes the mixture to go into an emulsion wherein the polymerization is allowed to take place. Although the polymerization is essentially completed in a few hours, the polymerization mixture is separated after about 16 hours. Separation of the polymer is accomplished by pouring the mixture into a beaker, acidifying with hydrochloric acid, and then adding sufficient tetrahydrofuran (THF) to separate the polymer from the mixture. The polymer, which is contained in the THF layer, is separated by means of a separatory funnel. After drying the polymer, a yield approaching 100% was calculated on the basis of the weight of the ingredients used and the weight of the polymer recovered.

The polymeric material was characterized by gel permeation chromatography and infrared measurements. The results show the presence of a co-polymer containing the monomers carboranyl methacrylate and butadiene.

The stable co-polymer may be varied in carboranyl methacrylate content from about 20 to 90 percent by weight of the co-polymer and in butadiene content from 10 to 80 percent. The emulsion polymerization process employs a concentration of ingredients based on a percent of the total weight of the two monomers specified generally as follows: the chain terminating agent such as dodecylmercaptan up to about 10 percent; the emulsifying agent such as benzylcetyldimethylammonium chloride up to about 10 percent; and the initiator such as azo-bis-isobutyronitrile up to about 2 percent. For lower molecular weight co-polymer, a higher percent chain terminating agent is used and likewise, when a higher molecular weight is desired, a lower percent of chain terminating agent is used. The weight of water in the polymerization mixture to the total weight of all other ingredients can vary from about 1 to 1 to about 2 to 1.

This co-polymer is intended primarily to be used as an ingredient in solid propellant compositions. Consequently, it should normally be made so that the viscosity, which is a function of its molecular weight, should be relatively low (i.e. similar to that of molasses). This facilitates mixing and further processing of the uncured propellant which contains the co-polymer. Co-polymers of a very high molecular weight would be too viscous to be used in solid rocket propellants because they could not be processed. The viscosity is controlled by varying the amount of dodecylmercaptan used in the polymerization mixture.

Based on experiments with a ter-polymer which is similar in structure with this co-polymer (Ref. U.S. Pat. No. 3,914,206) it should be possible to use the co-polymer of this invention along with ammonium perchlorate oxidizer, powdered aluminum fuel, and optional curatives and additives to produce propellant compositions having burning rate over the range from about 0.4 inches/sec to about 3.5 inches/sec. Propellant compositions should contain, by weight of the mixed propellant, about 15 to 30 percent of the co-polymer, aluminum powder from about 10 to 20 percent, ammonium perchlorate oxidizer from about 50 to 75 percent, and optional additives of 0.1 to 2.0 percent for processing and curing the propellant.

The amount of the co-polymer (and hence, the amount of the boron) added to the propellant composition must be varied to arrive at the desired ballistics. This can be accomplished in two ways: first, by varying the amount of the carboranyl co-polymer added to the propellant; and secondly, by varying the ratio of the carboranyl fraction in the co-polymer. As the ratio of the carboranyl methacrylate in the co-polymer is increased, the more boron there is in the co-polymer. Therefore a lesser amount of the high carborane co-polymer would be required in the propellant composition to give a particular burning rate than would be required to achieve the same burning rate with a low carborane co-polymer.

The carboranyl methacrylate—butadiene co-polymer is very compatible with and is a good plasticizer for the conventional polybutadiene polymers used as binders in propellant formulations. This in itself is a primary requirement for any carboranyl derivative or polymeric material added to a propellant formulation.

I claim:

1. A method of making a co-polymer having a controlled molecular weight and a relatively low viscosity, said co-polymer consisting in a weight percent range of the monomers carboranyl methacrylate from about 20 to about 90 weight percent and butadiene from about 10 to about 80 weight percent, said method employing an emulsion polymerization process comprising the steps of:

(a) combining said monomers in said weight percent range together in an aqueous mixture containing a weight percent of the total weight of the two monomers, a polymerization initiator of azo-bis-isobutyronitrile up to about 2 weight percent, a chain terminating agent of dodecylmercaptan up to about 10 weight percent to control the molecular weight of said co-polymer by employing a higher weight percent of said dodecylmercaptan when a lower molecular weight co-polymer is made and by employing a lower weight percent of said dodecylmercaptan when a higher molecular co-polymer is made, and an emulsifier of benzylcetyldimethylammonium chloride up to about 10 weight percent;

(b) reacting said aqueous mixture with agitation for a period of time to form said co-polymer;

(c) separating from said mixture said co-polymer thus formed by said reaction by pouring the mixture into a container, acidifying with hydrochloric acid, adding sufficient tetrahydrofuran to separate said co-polymer from the mixture to the tetrahydrofuran, separating said co-polymer contained in said tetrahydrofuran from said mixture, and removing said tetrahydrofuran from said co-polymer which after drying is obtained in a yield approaching 100% as calculated on the basis of the weight of the ingredients used and the weight of said co-polymer recovered.

2. The method set forth in claim 1 wherein said aqueous mixture is reacted for a period of time of up to 16 hours.

3. The co-polymer made by the method of claim 2.

* * * * *